United States Patent
Peckham

(10) Patent No.: US 7,375,437 B2
(45) Date of Patent: May 20, 2008

(54) HYDROELECTRIC DEVICE

(76) Inventor: Nicholas Peckham, 3151 W. Route K, Columbia, MO (US) 65203

( * ) Notice: Subject to any disclaimer, the term of this patent is extended or adjusted under 35 U.S.C. 154(b) by 0 days.

(21) Appl. No.: 11/277,319

(22) Filed: Mar. 23, 2006

(65) Prior Publication Data

US 2007/0222219 A1 Sep. 27, 2007

(51) Int. Cl.
*F03B 13/00* (2006.01)

(52) U.S. Cl. .......................... 290/54; 290/43

(58) Field of Classification Search ................. 290/42, 290/43, 44, 53, 54, 55; 60/498, 501; 416/7, 416/85

See application file for complete search history.

(56) References Cited

U.S. PATENT DOCUMENTS

| | | | | |
|---|---|---|---|---|
| 313,746 A | * | 3/1885 | Man | 290/43 |
| 328,447 A | * | 10/1885 | Brady | 290/43 |
| 1,339,012 A | * | 5/1920 | Ammons | 416/85 |
| 1,368,454 A | * | 2/1921 | Rebman | 416/85 |
| 1,409,249 A | * | 3/1922 | Shepard | 416/85 |
| 4,180,976 A | * | 1/1980 | Bunn | 60/325 |
| 4,260,902 A | * | 4/1981 | Crider | 290/43 |
| 4,335,093 A | * | 6/1982 | Salomon | 423/644 |
| 4,720,640 A | * | 1/1988 | Anderson et al. | 290/43 |
| 5,430,332 A | * | 7/1995 | Dunn, Jr. | 290/54 |
| 6,641,327 B1 | * | 11/2003 | Lassila et al. | 405/78 |
| 2006/0033341 A1 | * | 2/2006 | Kaufman | 290/54 |
| 2007/0001460 A1 | * | 1/2007 | Killian | 290/44 |
| 2007/0029805 A1 | * | 2/2007 | Marchetti | 290/54 |

* cited by examiner

*Primary Examiner*—Julio C. Gonzalez
(74) *Attorney, Agent, or Firm*—R. Scott Kimsey

(57) ABSTRACT

The present invention provides a hydroelectric device including generally a base portion with a top surface, a bottom surface, and opposing sidewalls defining an interior space of the base portion. The interior space of the base portion is such that it is wider near the ends of the base portion and narrower in the interior of the base portion, essentially forming a venturi. The base portion also includes a central slot along a longitudinal axis thereof. The present invention further includes a wheel support portion fixedly attached to the base portion, a wheel portion rotatably attached to the wheel support portion and having a plurality of blades extending from a center thereof, and an electrical generator operably engaged with the wheel portion.

16 Claims, 8 Drawing Sheets

HYDROELECTRIC DEVICE

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

BACKGROUND OF THE INVENTION

Mankind has made use of the power of water for thousands of years. The ancient Greeks used waterwheels to grind wheat into flour more than two-thousand years ago, and waterwheel technology spread across Europe during the height of the Roman empire. Over the subsequent millennia, hydropower technology spread to a variety of applications, including the production of electricity.

Hydroelectric power is generally known in the art, and hydropower is a common means of producing electricity around the world. In some South American countries, hydroelectric power accounts for more than 50% of the national supply of electricity. Most hydroelectric power is generated from the potential energy stored in water when that water is dammed and held, for example, in a reservoir. That potential energy is converted to kinetic energy when water is released from the reservoir through the dam, and the kinetic energy of the released water operates a turbine, which results in the production of electricity therefrom. A chief advantage of hydroelectric power is that, because hydroelectric facilities do not require an external fuel source, they are immune to variations in prices for fossil fuels such as oil, natural gas, or coal.

Despite the advantages of hydroelectric power, the hydroelectric facilities in existence today suffer from a number of drawbacks. With respect to the reservoir-and-dam method of producing electricity from hydropower, the amount of energy extracted from the water depends directly on the difference in height between the source of the water and the water outflow (this difference is referred to in the art as the head). Thus, such systems are not well-suited to use in areas having a substantially flat geography. Large hydroelectric facilities may also have undesirable environmental impacts. For example, dams along the pacific coast of North America have been shown to reduce the indigenous salmon population by preventing access to spawning grounds upstream. Engineers have attempted to address this issue by installing 'fish ladders' at many dams, but the results have shown only a limited success.

In addition to impacting fish populations, hydroelectric dams have an effect on downstream riverbeds. Because the water exiting the turbine generally contains little suspended sediment, the water tends to scour downstream riverbeds and erode riverbanks. Further, the change in flow rate over the daily cycle of a hydroelectric dam can lead to erosion of sandbars and other downstream structures. Dissolved oxygen content in the water released from the dam may be lower than normal, which can impact downstream flora and fauna, and temperature differences between the water held in the reservoir and the downstream water flow can also have a negative impact on biological populations downstream.

In addition to affecting plant and animal populations, hydroelectric dams may also adversely affect human populations in the area. Such projects may require the relocation of persons living in the area where the reservoirs are planned. In many places around the world, this can result in the loss of important cultural or ancestral lands. Further, in some such projects historically important sites have been lost.

The present invention provides a novel device for producing hydroelectric power that minimizes the disadvantages described above. These and other advantages of the present invention will become clear upon reading the description of the present device, below.

BRIEF SUMMARY OF THE INVENTION

The present invention provides a hydroelectric device including generally a base portion with a top surface, a bottom surface, and opposing sidewalls defining an interior space of the base portion. The interior space of the base portion is such that it is wider near the ends of the base portion and narrower in the interior of the base portion, essentially forming a venturi. The base portion also includes a central slot along a longitudinal axis thereof. The present invention further includes a wheel support portion fixedly attached to the base portion, a wheel portion rotatably attached to the wheel support portion and having a plurality of blades extending from a center thereof, and an electrical generator operably engaged with the wheel portion.

When water passes through he base portion of the device, its flow rate is accelerated by the venturi-like design of the interior of the base portion and the wheel portion of the device is positioned with a portion of the blades thereof passing through the central slot of the base portion so that the water flowing through the base portion impacts the blades of the wheel causing the wheel to rotate, thereby producing electricity.

In one aspect of the present invention, the electrical generator associated therewith is an asychronous generator.

In another aspect of the present invention, the blades of the wheel are substantially concave with respect to the direction from which water enters the device.

In another aspect of the present invention, a self-cleaning filter is associated with the device to prevent debris from entering therein.

DETAILED DESCRIPTION OF THE INVENTION

Figure 1:
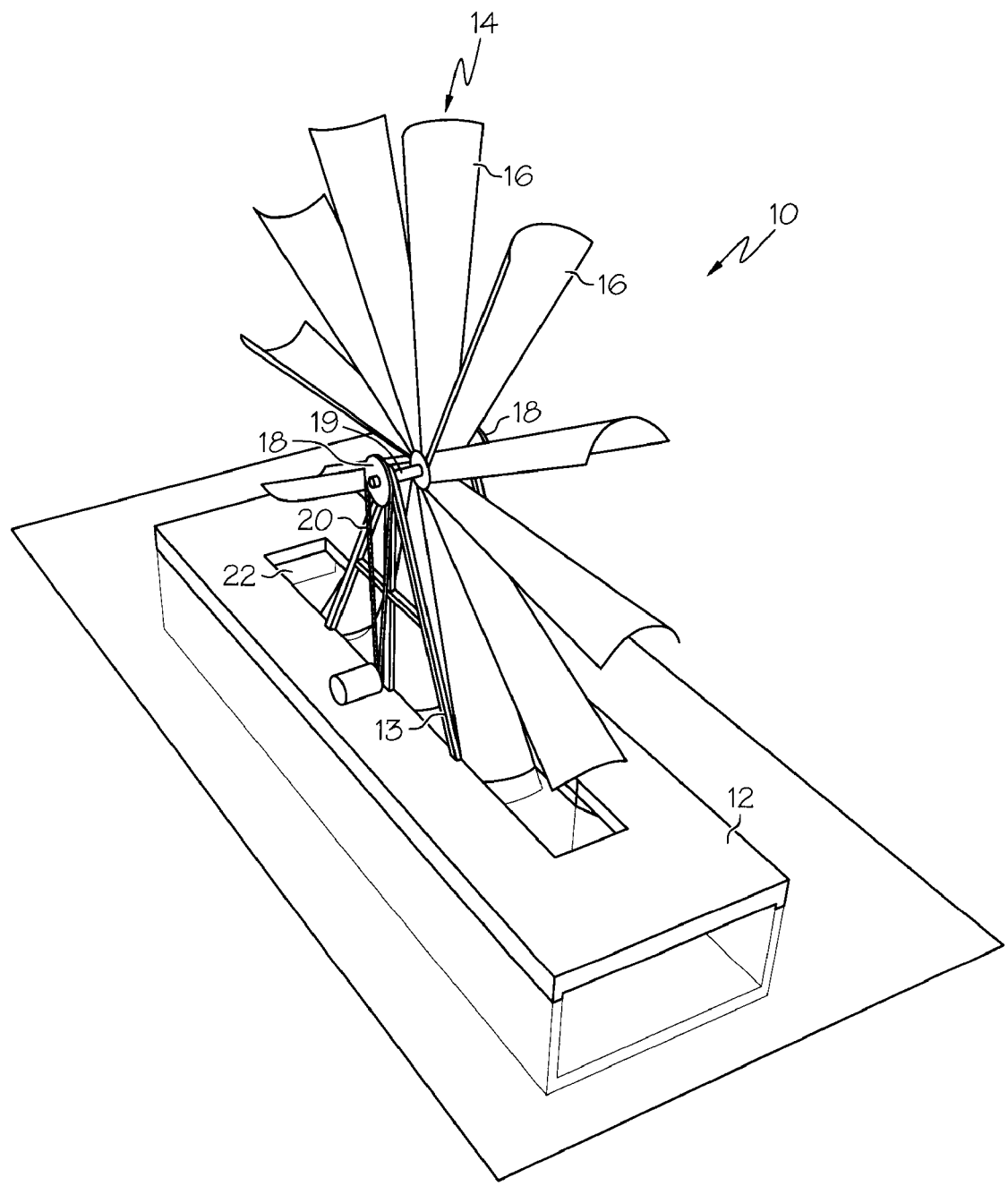
FIG. 1 is a side perspective view of one embodiment of a device constructed in accordance with the teachings of the present invention.

Turning now to the drawings, wherein like numerals indicate like parts, the numeral 10 indicates generally a hydroelectric device constructed in accordance with the teachings of the present invention. The present hydroelectric device preferably includes a base portion 12, a wheel 14, the wheel having a plurality of blades 16 disposed along a circumference thereof, a pulley 18 associated with said wheel, a belt 20 associated with said pulley, and a nozzle portion 22 associated with or formed within base portion 12. While these features are included in preferred embodiments of the present invention, it is contemplated that additions or modifications to these features may be provided as described below.

FIG. 1 is a side perspective view of one embodiment of the device of the present invention. As is shown, base portion 12 of device 10 is positioned in a river or other waterway during operative use of the device. Base portion 12 is positioned such that substantially all of base portion 12 is located under water, but not such that water covers the top portion of base portion 12. In order to secure base 12 in a position such that the present device may be used, base portion 12 must in some way be anchored to the bottom of the river or waterway, or to a nearby bank or other anchoring structure, whether natural or artificial. Examples of anchoring devices include, but are not limited to, cast iron anchors such as those common to naval or merchant vessels, or cables connected to concrete piers. It is contemplated that any suitable means of anchoring the present device in a river or other waterway may be used.

Although not shown in the drawings, base 12 preferably includes an interior space into which water can be pumped for ballasting thereof. It is further preferred that the interior space of base 12 be subdivided into a plurality of compartments to minimize the "free surface" effect of water moving therein. The ballasting mechanism is useful for adjusting the depth of blades 16 of wheel 14 in the river or waterway, or for removing the water wheel entirely from the river or waterway.

Wheel support portion 13 is preferably fixedly attached to base portion 12 and extends in an upward direction therefrom. In a preferred embodiment of the present invention, two wheel support portions 13 are provided, one disposed on each side of wheel 14 when wheel 14 is in operable position. It is contemplated, however, that a single wheel support portion 13 may also be used. As shown in the figures, wheel support portion 13 preferably includes two long support bars extending upward from base portion 12 at an angle such that they intersect approximately midway along the length of base portion 12 and at a substantially right angle to one another, a third long support bar that extends upward from approximately midway along the length of base portion 12 and perpendicularly thereto to intersect with the first two long support bars described above, and a plurality of small crossbars to provide additional support to the device. While wheel support portion 13 is constructed in the manner described above in a preferred embodiment of the present invention, it is contemplated that any suitable wheel support structure may be used, and that various suitable support structures will be readily apparent to those of skill in the art upon reading this disclosure.

Device 10 further includes an axle 19 extending through a central opening in wheel 14 and through openings in each of wheel support portions 13, in the embodiment of the present invention including two wheel support portions 13, or through an opening in the single wheel support portion 13 in embodiments of the present invention including only one wheel support portion 13. Axle 19 is fixedly attached to wheel 14 such that rotation of wheel 14 produces a corresponding rotation of axle 19. Further, axle 19 is freely rotatable within the openings in one or more of wheel support portions 13 such that wheel support portions 13 do not hinder the rotation thereof.

Wheel 14 itself is positioned such that it may rotate freely when the present device is in operation. The vast majority of wheel 14 is present above the level of the water at any given time, as shown in FIG. 1, with the lower portion of wheel 14 extending through an opening 22 in base portion 12 and into the water below. As the water of the river or waterway in which device 10 is positioned moves through nozzle portion 22 formed in the underside of base portion 12, the water impacts blades 16 of wheel 14 and causes rotation of wheel 14. In a preferred embodiment of the present invention, blades 16 have a generally concave shape when viewed from the side of blades 16 impacted by water flowing through nozzle portion 22 of device 10. It is also preferred that the bottom of each blade is curved rather than flat. Although such a configuration of blades 16 is preferred, it is contemplated that any suitable size, shape, or configuration of blades may be used.

At least one pulley 18 is provided fixedly attached to axle 19 such that rotation of axle 19, which is caused by rotation of wheel 14, causes in turn the rotation of pulley 18. In a preferred embodiment of the present invention, two pulleys 18 are provided, as shown in FIG. 1 and better seen in FIG. 3. It is contemplated, however, that one pulley will suffice in some embodiments of the present invention.

Rotation of pulleys 18, as described above, results in a corresponding motion of belts 20, which are operably engaged with an electrical generator. Electrical generators are well known in the art, as are the mechanism by which they may be engaged with a turbine or other rotational energy source for the purpose of producing electricity. It is contemplated that any suitable electrical generator currently known in the art or devised after this writing may be coupled to device 10 for the purpose of producing electricity.

Figure 2:
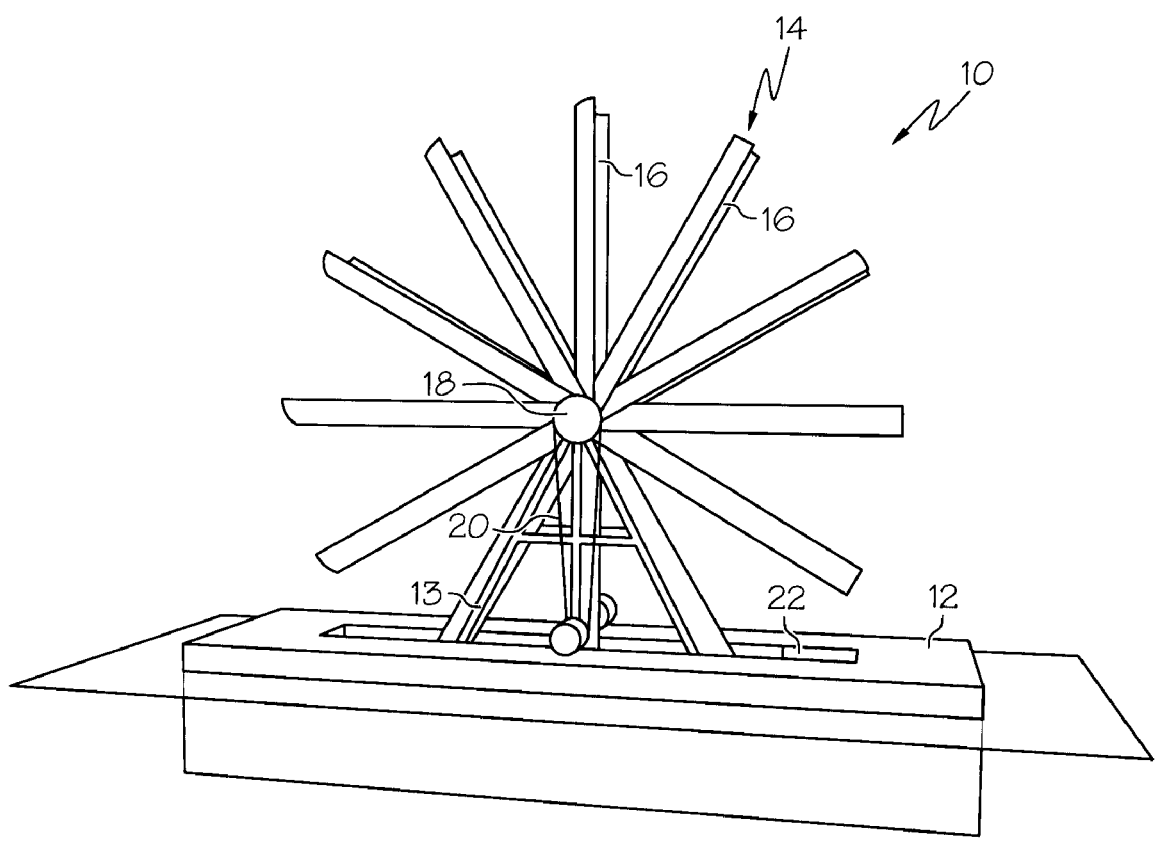
FIG. 2 is a side elevational view of one embodiment of a device constructed in accordance with the teachings of the present invention.

FIG. 2 is a side elevational view of the embodiment of device 10 shown in FIG. 1. The position of base portion 12 within a waterway is clearly shown in the figure. It should be noted, however, that this positioning is exemplary, as are the size, shape, and relative dimensions of base portion 12. Depending on the particular application for which a given device 10 is being used, the dimensions and shape of base portion 12 may vary. Likewise, the size of wheel 14, and the size and shape of blades 16 may vary according to the specific needs or desires associated with applying the present invention to a particular problem.

In addition to providing a clear view of base portion 12, FIG. 2 also provides a view of one embodiment of wheel support portion 13, as described above, and shows the disposition of pulley 18 and belt 20 with respect to the embodiment of the present invention shown and described.

Figure 3:
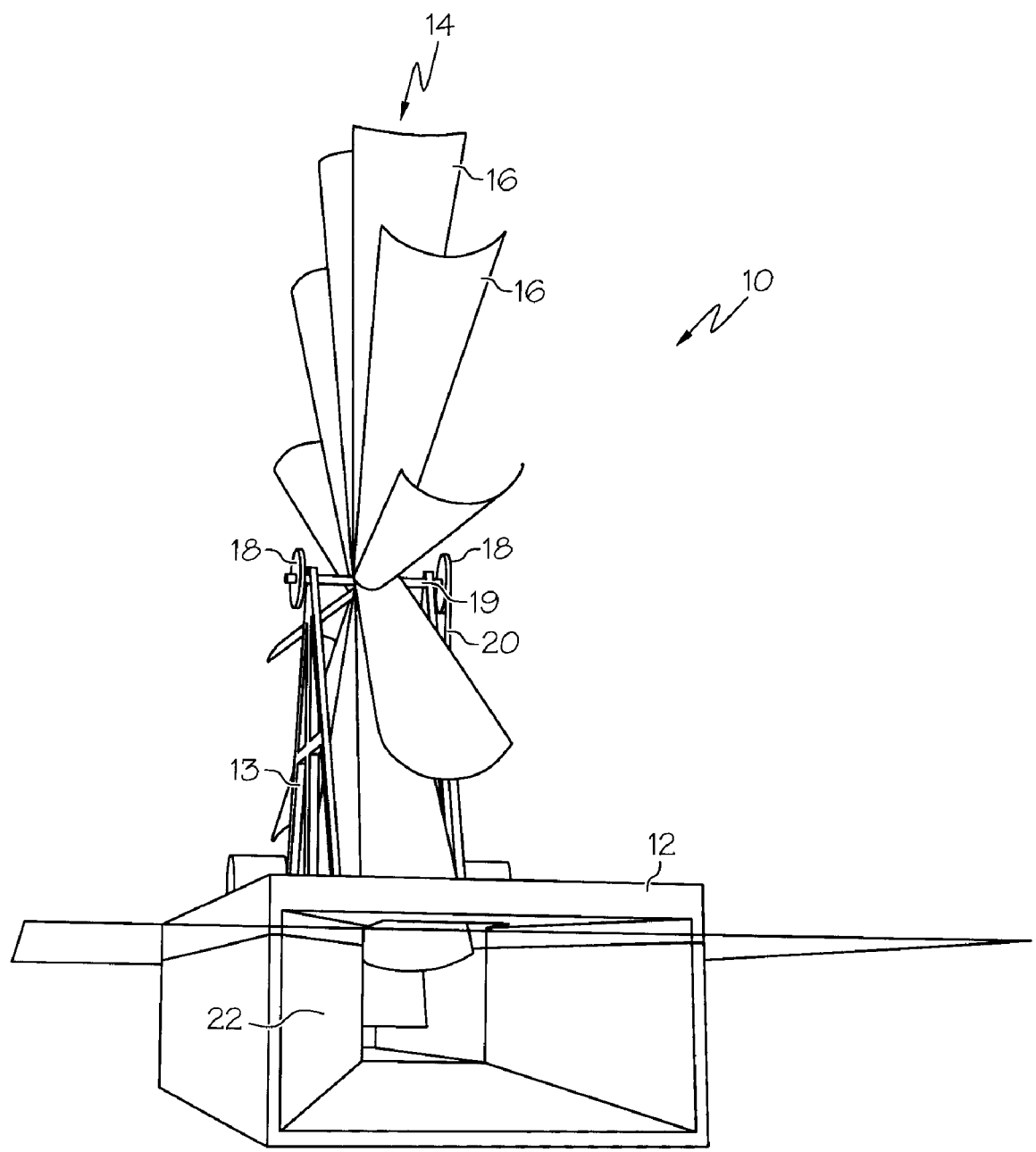
FIG. 3 is a front perspective view of one embodiment of a device constructed in accordance with the teachings of the present invention.

FIG. 3 provides a front perspective view of one embodiment of the present invention. The various features of the invention are as described above. Base portion 12 is seen operably positioned within a river or other waterway, the figure providing a view of device 10 from an upstream perspective. The concave shape of blades 16 is clearly shown in the figure, the shape being provided to maximize the transmission of kinetic energy from the waterway to wheel 14.

Also shown in FIG. 3 is nozzle portion 22 of the present invention. Nozzle portion 22 is sized and shaped to increase the flow rate of water through device 10, thereby increasing the rate of rotation of wheel 14 and, correspondingly, the amount of energy produced by device 10. As shown in the figure, nozzle portion 22 includes a constriction that forces a volume of water to travel through a smaller space than that available when the water enters base portion 12. It is preferred that the constriction be formed such that the sidewalls of nozzle portion 22 are continuous and smooth, rather than having sharp edges, in order to minimize turbulence in device 10.

Base portion 12 preferably further includes a bottom, as also shown in FIG. 3, such that an interior space is formed within base portion 12. This interior space forms nozzle portion 22, through which water is directed, the velocity of the water having been increased by the shape of nozzle portion 22. Nozzle portion 22, therefore, acts substantially as a venturi in a preferred embodiment of the present invention. The presence of a bottom formed in base portion 12 further ensures that kinetic energy from the water will not be lost by water moving around the sides of, or beneath, blades 16. The presence of nozzle portion 22 forces water that enters base portion 12 to impact blades 16, thereby causing a more forceful rotation of wheel 14.

Figure 4:
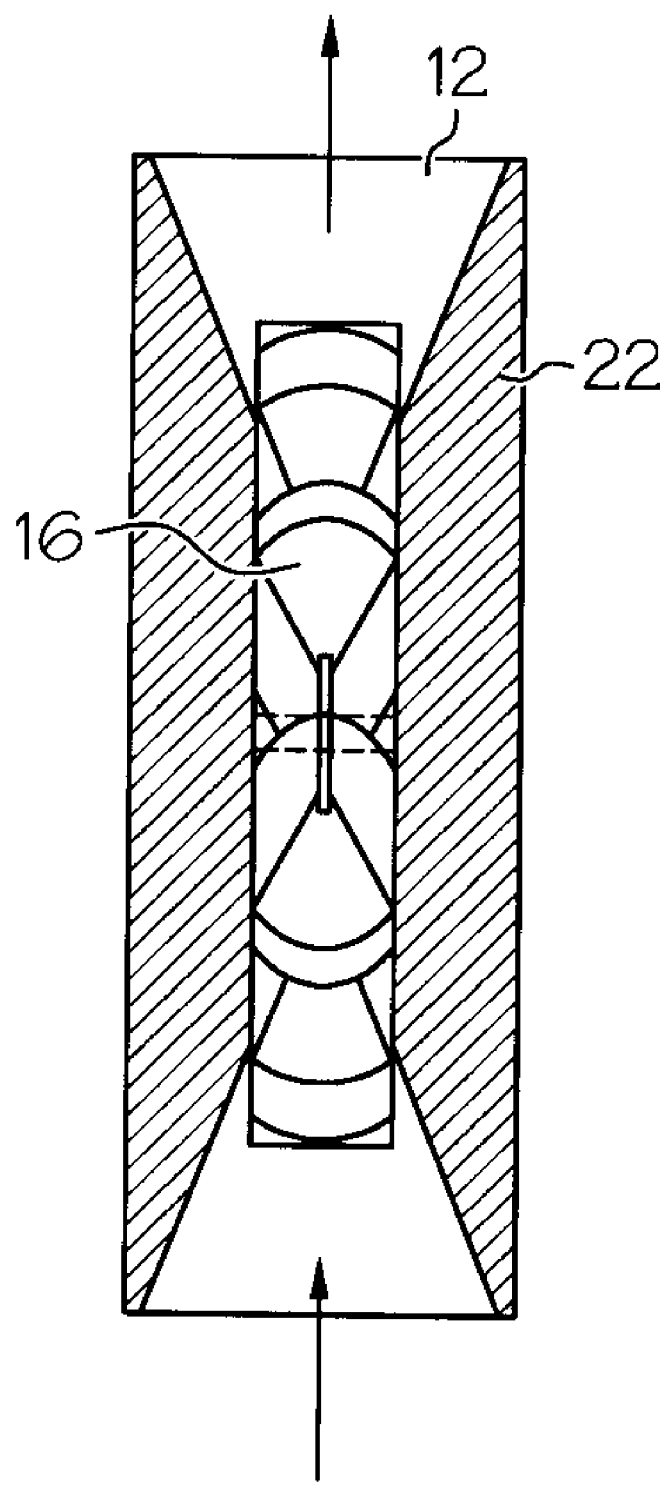
FIG. 4 is a cross-sectional bottom plan view of a base portion of one embodiment of a device constructed in accordance with the teachings of the present invention.

FIG. 4 provides a cross-sectional view of base portion 12 with a portion of blades 16 of wheel 14 disposed in an opening therein. This cross-sectional view of base portion 12 shows clearly the venturi structure of nozzle portion 22. The direction of water flow through device 10 is indicated by the arrow in FIG. 4.

The presence of nozzle portion 22 has a dramatic effect on the amount of electricity produced by hydroelectric device 10. Likewise, the size of wheel 14 as well as blades 16 of wheel 14 also affect the amount of energy produced by device 10. Table 1, below, provides data for a device 10 positioned in a waterway wherein the water is moving at either four or five miles per hour and wheel 14 has a diameter of 100 feet. The effect of variations in the size of blades 16 is also provided. The results provided in Table 1 correspond to a hypothetical device 10 wherein nozzle portion 22 is not present.

TABLE 1

| River Speed (mph) | Blade Area (ft) | C | Q | Blade Diameter | Megawatts Produced |
|---|---|---|---|---|---|
| 5 | 8 × 12 | 0.113491 | 704 | 46 | 2.33 |
| 5 | 9 × 16 | 0.113491 | 1056 | 46.5 | 3.53 |
| 4 | 8 × 12 | 0.113491 | 563 | 46 | 1.86 |
| 4 | 9 × 16 | 0.113491 | 845 | 46.5 | 2.83 |

Table 2, below, provides data for a hypothetical device 10 positioned in a waterway wherein the water is moving at either four or five miles per hour and wheel 14 has a diameter of 120 feet. The effect of variations in the size of blades 16 is also provided. The results provided in Table 1 correspond to a device 10 wherein nozzle portion 22 is not present.

TABLE 2

| River Speed (mph) | Blade Area (ft) | C | Q | Blade Diameter | Megawatts Produced |
|---|---|---|---|---|---|
| 5 | 8 × 12 | 0.113491 | 704 | 56 | 2.84 |
| 5 | 9 × 16 | 0.113491 | 1056 | 56.5 | 4.29 |
| 4 | 8 × 12 | 0.113491 | 563 | 56 | 2.27 |
| 4 | 9 × 16 | 0.113491 | 845 | 56.5 | 3.43 |

The results in each of the tables above assume a wheel 14 efficiency of 85% and a nozzle portion efficiency of 70%. For each of the tables above, C is a constant used in the conversion of waterflow to horsepower and Q is the flow rate in cubic feet.

Table 3, below, provides data for hypothetical embodiments of device 10 having a wheel 14 with a diameter of 100 feet and including a nozzle portion 22 associated with device 10. The sizes of blades 16 are also provided.

TABLE 3

| River Speed (mph) | Blade Area (ft) | C | Q | Blade Diameter | Megawatts Produced |
|---|---|---|---|---|---|
| 5 | 8 × 12 | 0.113491 | 2402 | 46 | 7.95 |
| 5 | 9 × 16 | 0.113491 | 2731 | 46.5 | 9.14 |
| 4 | 8 × 12 | 0.113491 | 1922 | 46 | 6.36 |
| 4 | 9 × 16 | 0.113491 | 2185 | 46.5 | 7.31 |

As can be seen by comparison of Table 3 with Table 1, the resulting megawatt production from a device 10 having a nozzle portion 22 is significantly greater than that produced by a device 10 lacking a nozzle portion 22. Table 4, below, provides data for hypothetical embodiments of device 10 having a wheel 14 with a diameter of 120 feet and including a nozzle portion 22 associated with device 10.

TABLE 4

| River Speed (mph) | Blade Area (ft) | C | Q | Blade Diameter | Megawatts Produced |
|---|---|---|---|---|---|
| 5 | 8 × 12 | 0.113491 | 2402 | 56 | 9.68 |
| 5 | 9 × 16 | 0.113491 | 2731 | 56.5 | 11.10 |
| 4 | 8 × 12 | 0.113491 | 1922 | 56 | 7.75 |
| 4 | 9 × 16 | 0.113491 | 2185 | 56.5 | 8.88 |

Again, by comparison of Table 4 with Table 2, it is seen that the resulting megawatt production from a device 10 having a nozzle portion 22 is significantly greater than that produced by a device 10 lacking a nozzle portion 22.

In addition to the embodiments of the present invention described above, it is contemplated that various additions or modifications may be made to the device. For example, in one embodiment of the present invention it is contemplated that a self-cleaning river filter may be provided with the device such that unwanted debris does not enter nozzle portion 22 of base portion 12 and cause damage to the device or hinder the flow of water through the device. Providing a self-cleaning filter reduces the amount of maintenance necessary to keep device 10 clean and operating properly. Further, the efficiency and stability of device 10 may be enhanced by providing self-centering blades 16 therewith.

Figure 5:
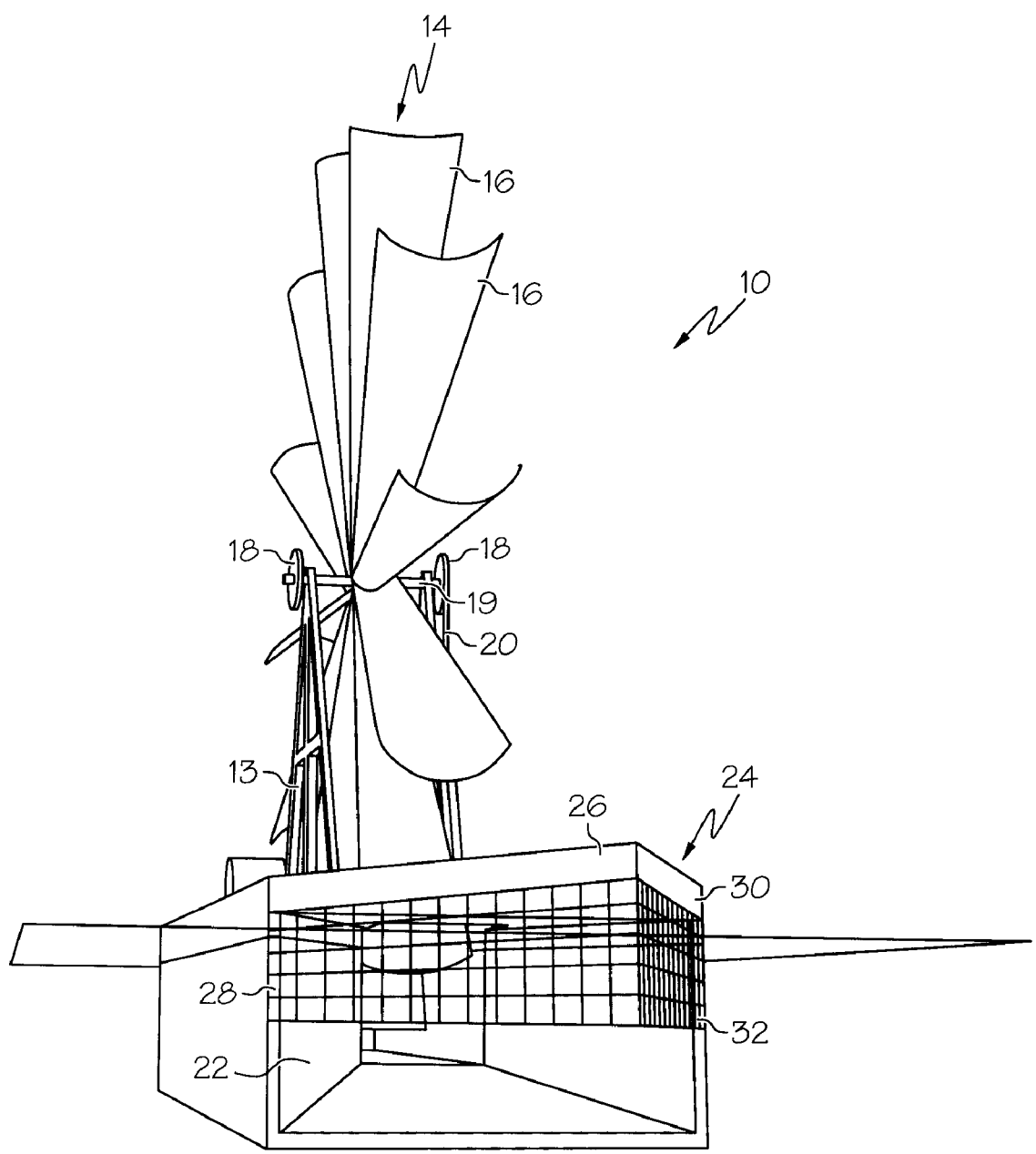
FIG. 5 is a front perspective view of one embodiment of the present invention including a self-cleaning filter associated therewith.

FIG. 5 provides a front perspective view of one embodiment of device 10 that includes a self-cleaning filter 24 constructed in accordance with the teachings of the present invention. Self-cleaning filter 24 includes two substantially similar sides, the first side including a first bumper portion 26 disposed above a surface of the waterway in which device 10 is positioned. First bumper portion 26 extends outward from base portion 12 of device 10 at an angle oriented toward the longitudinal axis of base portion 12. In a preferred embodiment of the present invention, a first side of filter 24 is rotatably attached to base portion 12 via a hinge (not shown) or other suitable fastener, the hinge or other suitable fastener being located where first bumper portion 26 meets base portion 12. First bumper portion 26 preferably further includes a first grill portion 28 fixedly attached thereto and extending downward therefrom. A second side of self-cleaning filter 24 includes a second bumper portion 30 disposed above the surface of the water and extending outward from base portion 12 at an angle oriented toward the longitudinal axis of base portion 12. In a preferred embodiment of the present invention, the second side of filter 24 is rotatably attached to base portion 12 via a hinge (not shown) or other suitable fastener, the hinge or other fastener being located where second bumper portion 30 meets base portion 12. Second bumper portion 30 preferably further includes a second grill portion 32 fixedly attached thereto and extending downward therefrom.

During general operation of device 10, self-cleaning filter 24 is preferably disposed as shown in FIG. 5, with both sides of filter 24 meeting substantially at a centerline along a longitudinal axis of base portion 12 to form a closed filter. Thus, filter 24 is adapted to deflect or screen debris floating on or near the surface of a waterway in which device 10 is placed for use in generating electricity. It is contemplated that grill portions 28 and 32 may extend even further downward than shown in FIG. 5 in order to cover the enter opening that leads to nozzle 22 of device 10.

The self-cleaning aspect of self-cleaning filter 24 is such that debris caught in either first grill 28 or second grill 32 can be returned to the river or waterway in a manner as to prevent the debris from being taken into nozzle 22 of device 10 and doing damage thereto. This is achieved by rotating the first and second sides of self-cleaning filter 24 around the point at which they fasten to base portion 12 such that first and second filters 28 are 32 become inverted with respect to the flow of the waterway. After such rotation, the sides of first and second grill portions 28 and 32 that were previously disposed toward the oncoming water flow in the waterway and now disposed away from the oncoming water flow. Thus, the direction of waterflow through first and second grills 28 and 32 is effectively reversed and any debris caught in filter 24 during normal operation of device 10 is washed away by this reversed waterflow. Because of the rotation of the two sides of filter 24, the debris caught in first and second grills 28 and 32 is released at a location such that it does not enter device 10 through nozzle 22. It is contemplated that the self-cleaning function of self-cleaning filter 24 may be initiated automatically at a predetermined time, however it is preferred that either the time of initiation, the actual rotation of the two sides of self-cleaning filter 24, or both, are manually chosen such that self-cleaning filter 24 is only opened when the river or waterway is substantially free of debris.

Figure 6:
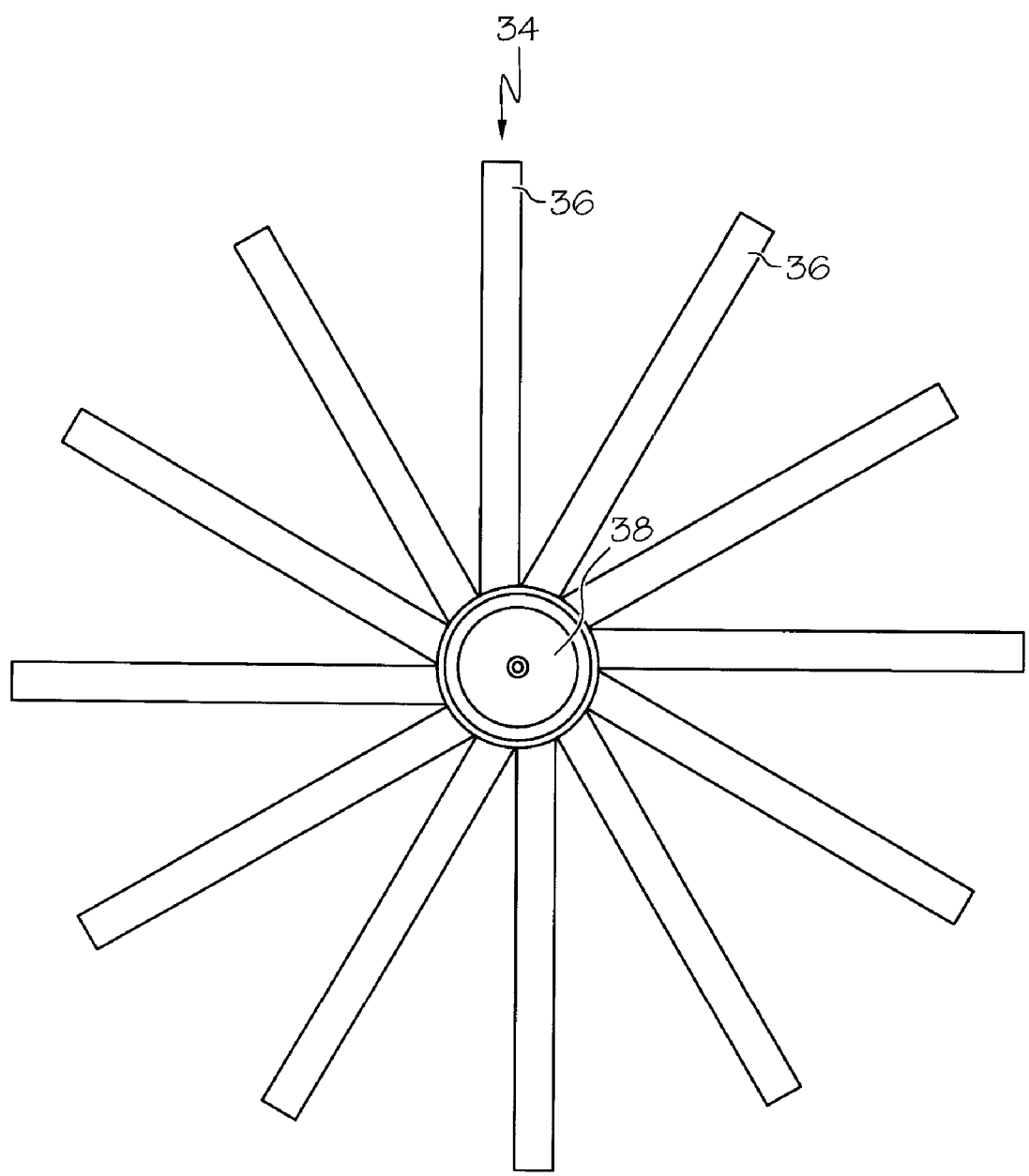
FIG. 6 is a side elevational view of one embodiment of a water wheel constructed in accordance with the teachings of the present invention.

FIG. 6 is a elevational view of one embodiment of a waterwheel 34 constructed in accordance with the teachings of the present invention. Waterwheel 34 differs from waterwheel 14 in that, rather than the blades attaching directly to an axle 19, blades 36 attach to a disc portion 38. This provides for a more sturdy attachment of blades 36 to device 10. It is contemplated that either of blades 16 or 34 may be attached to the present device by any suitable method of attachment, and further that blades 16 or 34 may be removably attached to device 10 such that device 10 can be readily transported without a fully assembled waterwheel 14 or 34 in place during transit.

Figure 7:
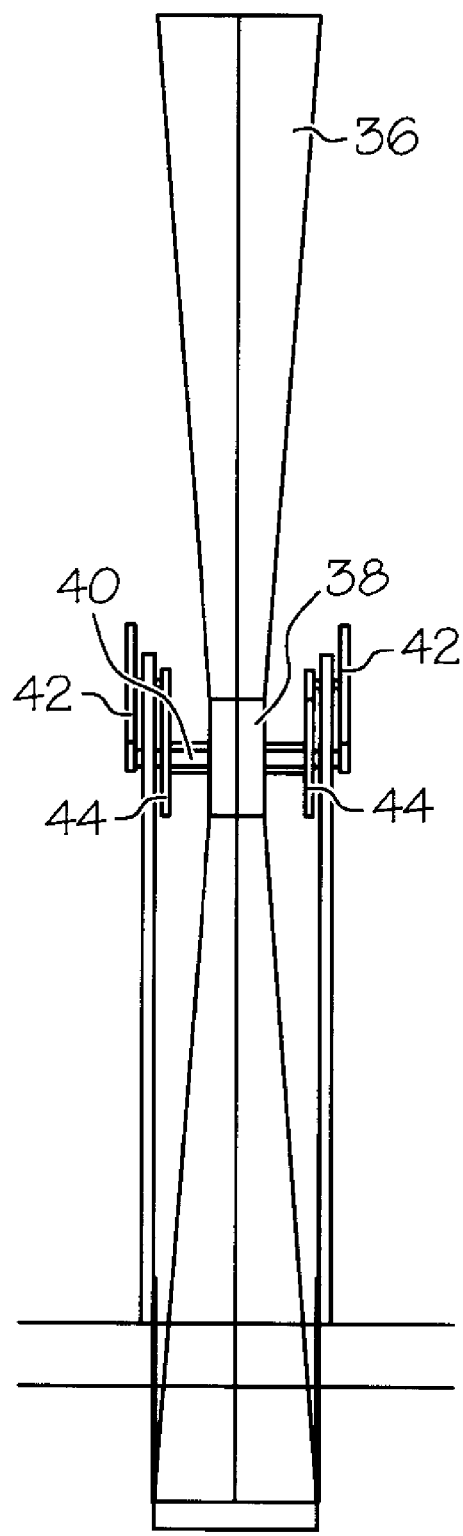
FIG. 7 is a front elevational view of a water wheel and electrical generator of one embodiment of a device constructed in accordance with the teachings of the present invention.

FIG. 7 provides a front elevational view of a waterwheel 46 and device for generating electricity therefrom constructed in accordance with the teachings of the present invention. Blades 36 of waterwheel 46 are "V" shaped, with the centerline running along blades 36 in the figure constituting the bottom of the "V." Blades 36 of waterwheel 46 are attached, either fixedly or removably, to a central disc 38. Central disc 38 in turn engages an axle 40 which rotates when waterwheel 46 rotates. Rotation of axle 40 in turn results in rotation of plates 42 and 44, which are preferably geared so as to rotate in opposite directions. Plate 44 preferably spins in place, rotating about a central axis thereof, whereas plate 42 rotates through an imaginary circle around the center of axle 40 (which is located at the bottom of plates 42 as shown in the drawings). Either of plate 42 or 44 includes a series of coils, while the other of plate 42 or 44 includes a series of magnets of alternating polarity. Thus, when waterwheel 46 rotates, the results action on plates 42 and 44 creates an alternating electrical current by means of induction. Other variations of such an asynchronous generator are known in the art and it is contemplated that any suitable generator, as well as any other suitable types of generator, may be used in conjunction with the present invention. It is further contemplated that, although plates 42 and 44 (and in previous figures, pulley 18 and belt 20) are shown exposed in the figures for purposes of clarity, these components of the present device are preferably contained within an enclosed housing for protection from water and the elements.

Figure 8:
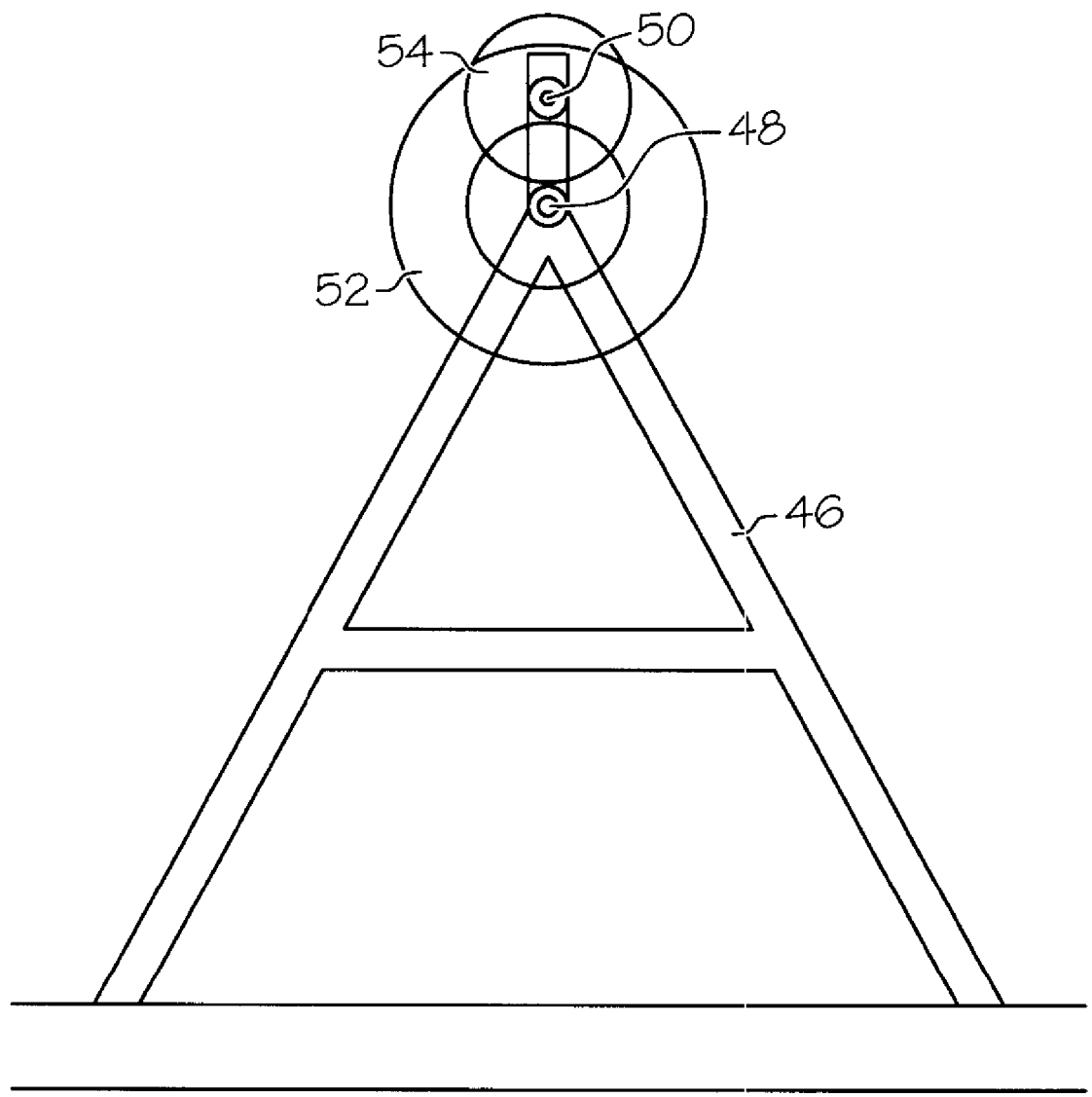
FIG. 8 is a side view of a wheel support and electrical generator of one embodiment of a device constructed in accordance with the teachings of the present invention.

FIG. 8 is a side view of a wheel support portion 46 and an alternative embodiment of the electrical induction device described with respect to FIG. 7. In FIG. 8, for example, the axle rotated by rotation of a waterwheel is represented by the numeral 48. This results in a corresponding rotation of plate 52. Also attached to axle 48 is a length of material, such as for example a metal bar, to which plate 54 is attached via, for example, a pin 50. The device preferably includes gearing between axle 48 and pin 50 such that rotation of plate 54 preferably occurs in the opposite direction as that of plate 52. Thus a counter-rotation is established between plates 52 and 54. Plates 52 and 54 preferably includes either coils or magnets as described with respect to FIG. 7, above.

In addition to the above, the anchoring mechanism used to hold a device 10 in place may be adjustable such that device 10 may be moved along the width or length of a river or other waterway to make way for traffic thereon. In some embodiments of the present invention, a plurality of devices 10 may be associated with one another such that the energy output of each device 10 is combined with that of each of the other devices 10. The energy output of one or more devices 10 may be added to an electrical grid to serve as an energy supply for human habitations and other needs in the area, or may be utilized by a self-contained hydrogen generator that may be provided with device 10, the hydrogen generated therefrom then being available for use as an energy source.

As can be seen from the drawings and the description above, the present device does not suffer from many of the drawbacks of prior hydroelectric devices such as a reservoir-and-dam hydroelectric device. The present device may be installed in a waterway without damage to the surrounding area, and without the need to create a reservoir or otherwise change the topography of the region immediately surrounding the device. Thus, people and animals living in the area are not displaced by use of the present device. Further, the present device does not substantially negatively effect the sediment content, temperature, or oxygen levels of the water in which device 10 is being used, nor does device 10 present an impassable barrier for fish or other fauna living in the waterway who may wish to move along the length of the waterway due to feeding patterns, migratory patterns, and the like.

It will be obvious to those of skill in the art upon reading this disclosure that many variations of the present invention are possible without departing from the spirit or scope of the invention described herein. The number and kind of modifications that may be made to the present device are varied and large, and it is contemplated that such modifications are within the scope of the present invention. The specific embodiments described herein are given by way of example only, and the present invention is limited only by the appended claims.

What is claimed is:

1. A hydroelectric device comprising:
   a) a base portion having a first end at a substantially upstream end of said device when said device is in operable position within a body of water and a second end at a substantially downstream end of said device when said device is in operable position within a body of water, and further having opposing side walls, a top surface, and a bottom surface, said opposing sidewalls and top and bottom surfaces defining an interior space therein, said interior space being wider at said first and second ends of said base portion than at an interior of said base portion, said top surface of said base portion having a central slot along at least a portion of a longitudinal axis thereof;
   b) a wheel support portion fixedly attached to said base portion and extending away therefrom;
   c) a wheel portion rotatably attached to said wheel support portion, said wheel portion having a plurality of blades extending from a center thereof, wherein said plurality of blades pass through said central slot of said base portion when said wheel is rotated; and
   d) an electrical generator operably engaged with said wheel portion, wherein when water is introduced into said first end of said base portion, the rate of flow of the water is increased by the shape of said interior space of said base portion,
   and further wherein when said wheel portion is operably positioned on said wheel support, the blades of said wheel portion are impacted by the accelerated water and said wheel portion is thereby caused to rotate,
   and further wherein electricity is produced from the rotation of said wheel portion, said hydroelectric device being positioned in said body of water such that at least a first portion of said body of water flows through said interior space of said base portion, and at least a second portion of said body of water flows around said hydroelectric device.

2. The device according to claim 1 wherein said electrical generator is an asynchronous generator.

3. The device according to claim 1 wherein each of said plurality of blades is substantially concave with respect to the direction from which water enters said device during operation of said device.

4. The device according to claim 1 further comprising a filter portion attached to a first end of said base portion, said filter portion being adapted to filter water passing into said device and substantially preventing debris from entering said device.

5. A hydroelectric device comprising:
   a) a base portion having first and second ends, and further having opposing side wall; a top surface, and a bottom surface, said opposing side walls and top and bottom surfaces defining an interior space therein, said interior space being wider at said first and second ends of said base portion than at an interior of said base portion, said top surface of said base portion having a central slot along at least a portion of a longitudinal axis thereof;
   b) a wheel support portion fixedly attached to said base portion and extending away therefrom;
   c) a wheel portion rotatably attached to said wheel support portion, said wheel portion having a plurality of blades extending from a center thereof, wherein said plurality of blades pass through said central slot of said base portion when said wheel is rotated;
   d) an electrical generator operably engaged with said wheel portion; and
   e) a filter portion attached to said first end of said base portion, said filter portion being adapted to filter water passing into said device and substantially preventing debris from entering said device,
   wherein when water is introduced into said first end of said base portion, the rate of flow of the water is increased by the shape of the interior space of said base portion, and further wherein when said wheel portion is operably positioned on said wheel support, the blades of said wheel portion are impacted byte accelerated water and said wheel portion is thereby caused to rotate,
   and further wherein electricity is produced from the rotation of said wheel portion, and further wherein said filter portion comprises a first filter portion rotatably attached to a first corner of said first end of said device and a second filter portion rotatably attached to a second corner of said first end of said device, wherein said first and second filter portions come together to filter water passing through said filter and into said device in a first direction and substantially prevent debris from entering said device, and wherein when rotated said first and second filter portions move apart such that water passes through said filter in a second direction, thereby removing any debris accumulated by said filter portions.

6. The device according to claim 1 wherein said electrical generator comprises at least one pulley rotatably engaged with a belt, said belt operably engaged wit a turbine for production of electricity.

7. The device according to claim 1 wherein said electrical generator comprises a first plate portion having a plurality of coils disposed thereon and a second plate portion having a plurality of magnets disposed thereon such that when said first plate portion rotates relative to said second plate portion electricity is produced therefrom.

8. The device according to claim 1 further comprising a hydrogen generator operably engaged with said electrical generator.

9. The device according to claim 7 wherein at least one of said first and second plate portions is operably engaged with said wheel portion of said device such that rotation of said wheel portion results in the rotation of said at least one of said first and second plate portions.

10. A hydroelectric device comprising:
a base portion having a channel for flow of a fluid therethrough, said channel being wider at a first, foremost end of said channel and at a second, rearmost end of said channel than at a middle portion thereof, at least a portion of said base portion forming a bottom of said channel;
a wheel portion rotatably attached to said device such that a plurality of blades of said wheel portion protrude into said channel; and
an electrical generator operably engaged with said wheel portion,
wherein fluid flow through said channel causes rotation of said wheel portion, which in turn causes generation of electricity by said electrical generator,
said hydroelectric device being positioned in said body of water such that at least a first portion of said body of water flows through said channel of said base portion, and at least a second portion of said body of water flows around said hydroelectric device.

11. The device according to claim 1 wherein said base portion is a buoyant base portion.

12. The device according to claim 10 wherein said base portion is a buoyant base portion.

13. The device according to claim 1 wherein at least one of said plurality of blades has a substantially concave cross-section.

14. The device according to claim 10 wherein at least one of said plurality of blades has a substantially concave cross-section.

15. The device according to claim 1 wherein at least one of said plurality of blades has a V-shaped cross-section.

16. The device according to claim 10 wherein at least one of said plurality of blades has a V-shaped cross-section.

* * * * *

UNITED STATES PATENT AND TRADEMARK OFFICE
CERTIFICATE OF CORRECTION

PATENT NO. : 7,375,437 B2 Page 1 of 1
APPLICATION NO. : 11/277319
DATED : May 20, 2008
INVENTOR(S) : Nicholas Peckham It is certified that error appears in the above-identified patent and that said Letters Patent is hereby corrected as shown below:

Column 10, line 6, delete "wall," and insert -- walls, --.

Column 10, line 31, delete "byte" and insert -- by the --.

Column 10, line 50, delete "wit" and insert -- with --.

Signed and Sealed this

Nineteenth Day of August, 2008

JON W. DUDAS
*Director of the United States Patent and Trademark Office*